United States Patent
Hong et al.

(10) Patent No.: US 9,114,823 B2
(45) Date of Patent: Aug. 25, 2015

(54) ACTUATING DEVICE EMPLOYED IN STEERING SYSTEM FOR VEHICLE

(71) Applicant: MANDO CORPORATION, Pyeongtaek-si, Gyeonggi-do (KR)

(72) Inventors: Kwang Seok Hong, Seoul (KR); Nam Hwan Heo, Chuncheon-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 13/962,614

(22) Filed: Aug. 8, 2013

(65) Prior Publication Data

US 2014/0045634 A1 Feb. 13, 2014

(30) Foreign Application Priority Data

Aug. 8, 2012 (KR) .................. 10-2012-0086868

(51) Int. Cl.
  *B62D 5/04* (2006.01)
  *F16H 1/28* (2006.01)
  *B62D 5/00* (2006.01)

(52) U.S. Cl.
  CPC .............. *B62D 5/0409* (2013.01); *B62D 5/008* (2013.01); *F16H 1/28* (2013.01)

(58) Field of Classification Search
  USPC ......................................................... 475/339
  See application file for complete search history.

(56) References Cited

U.S. PATENT DOCUMENTS

| | | | | |
|---|---|---|---|---|
| 3,728,911 A | * | 4/1973 | Granville ...................... | 475/255 |
| 4,034,625 A | * | 7/1977 | Taintor .......................... | 475/291 |
| 4,598,603 A | * | 7/1986 | Hiramitsu et al. .......... | 74/484 R |
| 4,715,462 A | * | 12/1987 | Taig ............................... | 180/444 |
| 6,482,119 B2 | * | 11/2002 | Bodtker et al. ............... | 475/331 |
| 8,066,092 B2 | * | 11/2011 | Shimizu et al. ............... | 180/444 |
| 2006/0166782 A1 | * | 7/2006 | Bayer et al. ................... | 475/345 |
| 2008/0236933 A1 | * | 10/2008 | Kurokawa ..................... | 180/444 |
| 2011/0220432 A1 | * | 9/2011 | Bugosh et al. ................ | 180/444 |

FOREIGN PATENT DOCUMENTS

| | | |
|---|---|---|
| JP | 48-57058 | 8/1973 |
| JP | 62-4452 | 1/1987 |
| JP | 2000-085610 A | 3/2000 |
| JP | 2005-067429 A | 3/2005 |
| JP | 2005-180636 A | 7/2005 |
| JP | 2008-038990 A | 2/2008 |

OTHER PUBLICATIONS

Japanese Office Action issued in Japanese Application No. 2013-162150 dated May 25, 2015.

* cited by examiner

*Primary Examiner* — Justin Holmes
*Assistant Examiner* — David Morris
(74) *Attorney, Agent, or Firm* — McDermott Will & Emery LLP

(57) ABSTRACT

An actuating device employed in a steering system comprises an input-side sun gear, which is provided on an input shaft of a steering shaft and is rotated integrally with the input shaft of the steering shaft, an output-side sun gear, which is provided on an output shaft of the steering shaft and is rotated integrally with the output shaft, an input-side planetary gear, which is engaged with the input-side sun gear, revolves around the input-side sun gear, and is provided on a planetary gear shaft, and an output-side planetary gear, which is engaged with the output-side sun gear, revolves around the output-side sun gear, and is provided on a planetary gear shaft, the output-side planetary gear being spaced apart from the input-side planetary gear.

7 Claims, 7 Drawing Sheets

ACTUATING DEVICE EMPLOYED IN STEERING SYSTEM FOR VEHICLE

CROSS-REFERENCE(S) TO RELATED APPLICATIONS

This application claims priority from Korean Patent Application No. 10-2012-0086868, filed on Aug. 8, 2012, which is incorporated herein by reference in its entirety.

BACKGROUND OF THE INVENTION

1. Field of the Invention

The present invention relates to an actuating device employed in a steering system for a vehicle, and particularly, to an actuating device for changing a gear ratio employed in a steering system for a vehicle, which can be constructed to solve the problem of misalignment of a planetary gear shaft, compensate the tolerance of a sun gear, and minimize vibration and noise.

2. Description of Related Art

A steering apparatus is provided for changing the driving direction of a vehicle according to a driver's intention, and is an auxiliary apparatus that can change the center of rotation of front wheels of the vehicle to enable the vehicle to be driven in the direction desired by a driver.

Meanwhile, a power steering apparatus utilizes a device that provides auxiliary steering power when a driver operates a steering wheel, to supplement the operating force applied to the steering wheel by the driver so as to enable the driving direction of the vehicle to be easily changed with little force.

The power steering apparatus is mainly classified into a hydraulic power steering apparatus (HPS) and an electric power steering apparatus (EPS).

The hydraulic power steering apparatus is an apparatus in which, when working oil is supplied from a hydraulic pump, connected to the rotating shaft of an engine, to an operating cylinder, a rack bar is horizontally moved by means of auxiliary steering power generated by the pressure of the working oil to rotate both wheels. The above apparatus enables the driver to operate the steering wheel with little force.

In contrast, the electric power steering apparatus (EPS) is an apparatus in which, instead of a hydraulic pump and an operating cylinder, a rack bar or a column comprises a motor and an electronic control unit (hereinafter, referred to as an "ECU") to allow auxiliary steering power to be supplied by driving the motor.

Recently, to actively cope with the effect of the external environment, such as strong side winds or the left-right asymmetrical state of roads, on vehicles that are being driven, an active front wheel steering apparatus has been developed and marketed. In the active front wheel steering apparatus, a steering shaft between a steering wheel and a steering column is separately constructed, the steering angle generated by the steering wheel, which is operated by the driver, is not directly transmitted to the steering column, the steering angle, which frequently varies, is continuously sensed, the sensed steering angle is compared/analyzed together with all kinds of information on the vehicle, and an electric signal is then transmitted to a motor, which controls the rotation of a steering shaft of the steering column, to adjust the steering angle.

Further, this active front wheel steering system is provided with an actuating device for changing the gear ratio between an input and an output of a gearing device.

FIG. 1 is a view showing the structure of one example of a conventional active front wheel steering system for a vehicle, and FIG. 2 is a schematic view showing an actuating device for changing the gear ratio.

As shown in FIG. 1, a conventional active front wheel steering system comprises a steering wheel 10, a steering shaft 13 connected to the steering wheel 10, a steering column 15 encompassing the steering shaft 13, an input angle sensor 17 provided at the lower end of the steering column 15, an actuating device 19 provided below the input angle sensor 17 to change the gear ratio, a first motor 11 for operating the actuating device 19, a first motor positioning sensor 12 provided on the first motor 11, an output angle sensor 14 provided at the lower portion of the actuating device 19, a vehicle speed sensor 16 for sensing the vehicle speed, a rack-and-pinion mechanism 21 provided under the actuating device 19 for converting rotational movement of the steering shaft 13 into a linear movement of the rack bar 27, a second motor 18 for supplying auxiliary steering power to the rack bar 27, and an electronic control unit (ECU) 25 for receiving various signals from the input angle sensor 17, the first motor positioning sensor 12 and the output angle sensor 14.

As shown in FIG. 2, the conventional actuating device comprises an input shaft 31, a first sun gear 22 provided at the lower end of the input shaft 31, an input-side planetary gear 37 externally engaged with the first sun gear 22, an output-side planetary gear 38 connected to the input-side planetary gear 37 through a planetary gear axis 39, a second sun gear 23 externally engaged with the output-side planetary gear 38, an output shaft 24 connected to the second sun gear 23, a worm wheel 35, and a worm shaft 36.

The actuation principles of the conventional active front wheel steering system and the actuating device for changing the gear ratio having the above structure are as described below.

When the driver operates the steering wheel 10 to rotate the input shaft 31, the first sun gear 22 provided at the lower end of the input shaft 31 is rotated in response to the rotation of the input shaft 31.

In this case, in addition, the input-side planetary gear 37, which is externally engaged with the first sun gear 22, is rotated, and the output-side planetary gear 38, which is connected to the input-side planetary gear 37 via the planetary gear axis 39, is rotated.

Finally, the second sun gear 23, which is externally engaged with the output-side planetary gear 38, is rotated, and the output shaft 24, which extends from the second sun gear 23, is rotated in response to the rotation of the second sun gear. As a result, steering force generated from the steering wheel 10 operated by the driver is transmitted to the rack-and-pinion mechanism 21.

However, the above process is performed when the first motor 11 is not driven. If the first motor 11 is driven, the following change occurs.

If the vehicle speed sensor 16, for sensing the vehicle speed, the input angle sensor 17 and the output angle sensor 14, for sensing any change in the steering angle, and the first motor positioning sensor 12 generate electrical signals, respectively, and these electrical signals are transmitted to the ECU 25, the ECU 25 transmits an electrical signal to the first motor 11 to drive the first motor 11.

Also, as the first motor 11 is driven by the above process, the worm shaft 36, which is connected to a motor shaft (not shown), is rotated, and the worm wheel 35, which is engaged with the worm shaft 36, is rotated according to the rotation of the worm shaft. Finally, a carrier 29, which is formed integrally with the worm wheel 35, is rotated to enable the ratio of the output angle with respect to the input angle to be adjusted.

If the vehicle is driven at high speed, in the active front wheel steering system, when the driver turns the steering wheel 10 in one direction to rotate the input shaft 31, the first sun gear 22 and the input-side planetary gear 37, the ECU 25 controls the first motor 11 to allow the worm wheel 35 as well as the carrier 29 to be rotated in the direction by which the rotation of the output-side planetary gear 38 connected to the input-side planetary gear 37 is prevented, and so the rotation angle of the output shaft 24 eventually becomes smaller than that of the input shaft 31, to assist in the safe driving of the driver.

On the other hand, if the vehicle is driven at low speed for parking and so on, in the active front wheel steering system, the ECU controls the first motor 11 to allow the rotation angle of the output shaft 24 to become larger than that of the input shaft 31, and so the driver can easily drive the vehicle with little force.

Additionally, in the conventional actuating device shown in FIG. 2, the first sun gear 22, the second sun gear 23, the input-side planetary gear 37 and the output-side planetary gear 38 are generally formed in a helical gear shape. The helical gear is a gear in which a row of gear teeth is inclined with respect to, rather than parallel with, the axis of rotation of the gear. As compared with a gear in which the row of gear teeth is parallel with the rotation axis of the gear, since the length of the contact portion of a gear tooth engaged with a gear tooth of another helical gear is longer, the helical gear can transmit more power, and the helical gear rotates more smoothly due to the inclined row of gear teeth.

In the conventional actuating device constructed as above, however, since both end portions of the planetary gear shaft 39 are supported by bearings (not shown), the axis of the planetary gear shaft 39 becomes misaligned due to an error in the location of the bearings disposed at both ends of the planetary gear shaft 39. Additionally, for this reason, friction is increased, to thus generate noise.

Additionally, in the conventional actuating device, a damping structure for axially supporting the planetary gear shaft 39 is not applied. Thus, the conventional actuating device is disadvantageous in that the tolerance of the gear is not compensated, and vibration and noise are generated because no axial damping effect can be obtained.

Furthermore, in the conventional actuating device, since the worm wheel 35 and the carrier 29 are formed in a barrel shape and the bearings should be installed at both end portions of the planetary gear shaft 39, the weight, machinability of parts, and assemblability are deteriorated.

SUMMARY OF THE INVENTION

The present invention has been conceived to solve the above problems, and an object of the present invention is to provide an actuating device employed in the steering system for a vehicle, in which the planetary gear shaft on which the input-side planetary gear and the output-side planetary gear are provided is supported by only one bearing, whereby the problem of misalignment of the planetary gear shaft can be solved, and in which a ball-spring damping structure for elastically and axially supporting the input-side planetary gear and the output-side planetary gear is adopted so that tolerance of the gear can be compensated and vibration and noise can be minimized, and the entire structure is changed into a shape formed by combining three parallel circular-shaped plate sections and rods connecting the plates sections, whereby the structure can be simplified and made symmetrical to uniformly distribute power, the weight of the device can be reduced, and machinability and assemblability can be enhanced.

In order to achieve the above object, an actuating device employed in a steering system for a vehicle in accordance with the present invention comprises an input-side sun gear provided on an input shaft of a steering shaft and rotated integrally with the input shaft of the steering shaft; an output-side sun gear provided on an output shaft of the steering shaft and rotated integrally with the output shaft of the steering shaft; an input-side planetary gear that is externally engaged with the input-side sun gear, revolves around the input-side sun gear, and is provided on a planetary gear shaft; and an output-side planetary gear that is externally engaged with the output-side sun gear, revolves around the output-side sun gear, and is provided on a planetary gear shaft, the output-side planetary gear being spaced a certain distance apart from the input-side planetary gear, wherein the planetary gear shaft, on which the input-side planetary gear and the output-side planetary gear are provided, is supported by a bearing at only one point of a center portion thereof.

The input shaft of the steering shaft passes rotatably through a first plate section, a worm wheel, which is externally engaged with a worm shaft of a motor for steering assistance, is placed on the outer circumference of the first plate section, the output shaft of the steering shaft passes rotatably through a third plate section, which is spaced a certain distance apart from the first plate section, and a second plate section, on which a bearing for supporting the planetary gear shaft is installed, is provided between the first plate section and the third plate section. It is preferable for the first plate section, the second plate section and the third plate section to be integrally connected to a connecting rod.

It is preferable to connect the first plate section, the second plate section and the third plate section to the connecting rod by means of a tolerance ring.

Three planetary gear shafts are uniformly disposed around the input shaft or the output shaft of the steering shaft, and it is preferable that each of three connecting rods be disposed between two of three planetary gear shafts, which are uniformly disposed.

It is preferable to provide respective damping mechanisms at the first plate section and the third plate section for elastically and axially supporting both end portions of the planetary gear shaft.

Preferably, the damping mechanism provided at the first plate section comprises a damping housing inserted into the first plate section, a spring installed in the damping housing, and a ball provided such that the ball can be axially moved in the damping housing by the spring. Here, a portion of the ball is exposed out of the damping housing and is in contact with one end portion of the planetary gear shaft.

Preferably, the damping mechanism provided at the third plate section comprises a damping housing inserted into the third plate section, a spring installed in the damping housing, and a ball provided such that the ball can be axially moved in the damping housing by the spring. Here, a portion of the ball is exposed out of the damping housing and is in contact with the other end portion of the planetary gear shaft.

DESCRIPTION OF SPECIFIC EMBODIMENTS

Figure 1:
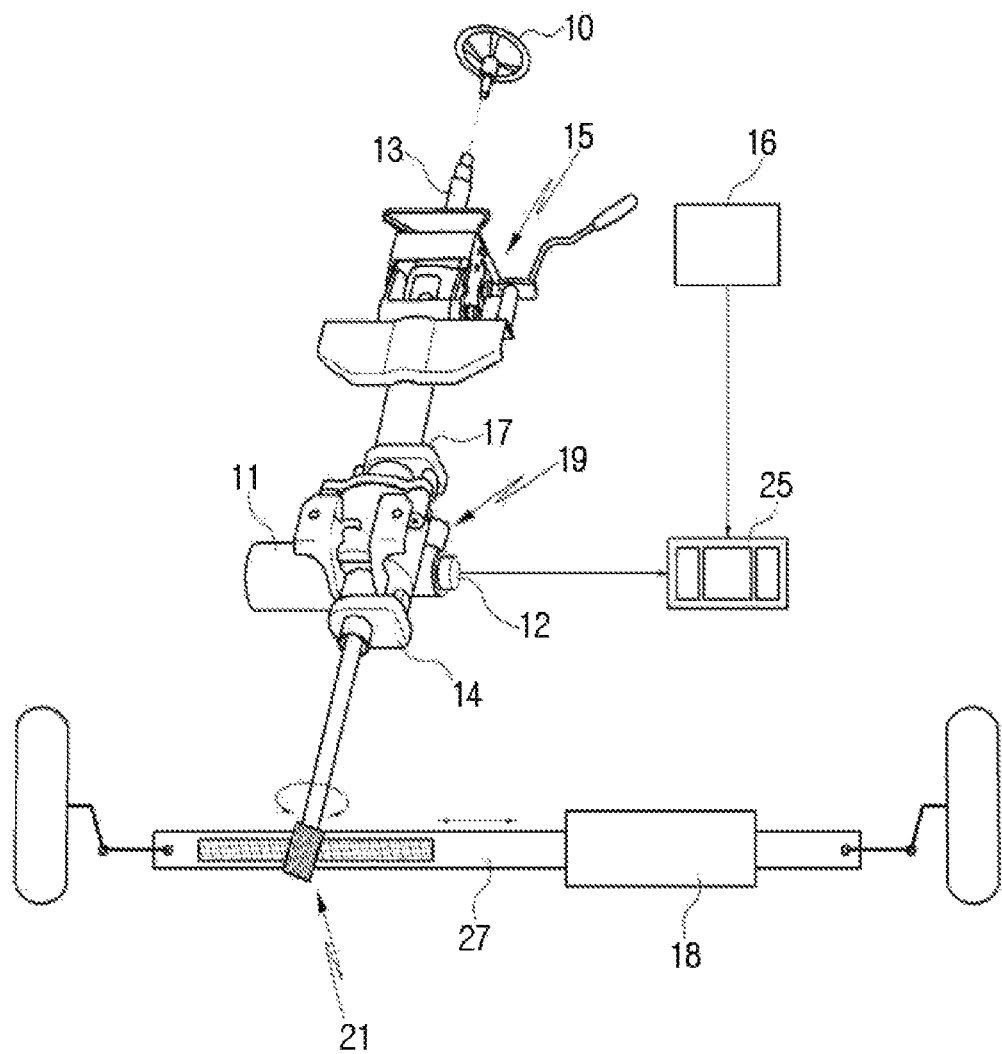
FIG. 1 is a view showing the structure of a conventional active front wheel steering system for a vehicle.
Figure 2:
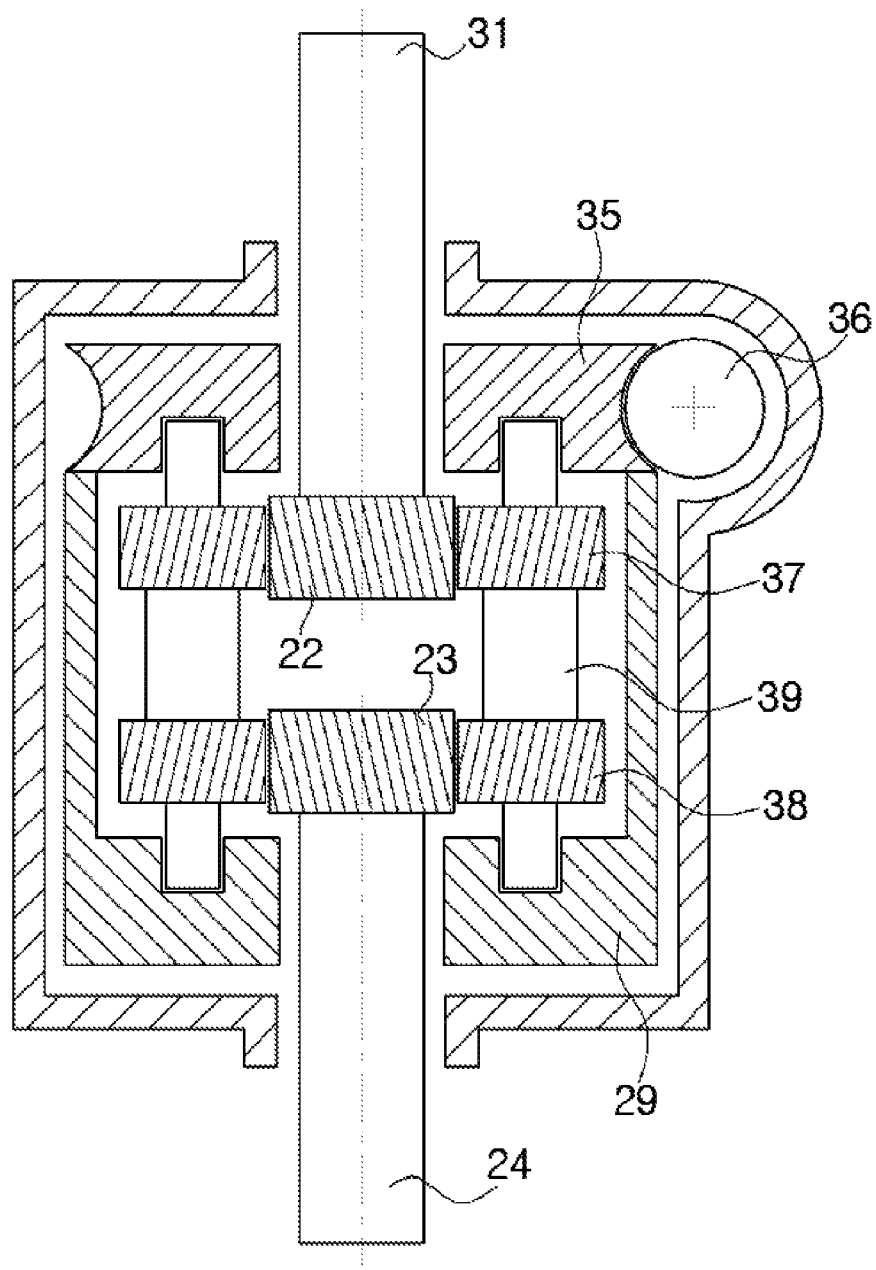
FIG. 2 is a view showing an actuating device for changing the gear ratio applied to a conventional active front wheel steering system for a vehicle.

Objects, specific advantages and novel characteristics of the present invention will become more apparent from the following detailed description and the preferred embodiment related to the accompanying drawings. In the description of the present invention, if the detailed description of related known technology can unnecessarily obscure the gist of the present invention, such detailed description is omitted. In addition, the thickness of lines or sizes of elements shown in the drawings can be exaggerated for perspicuity of the description and convenience. Furthermore, the terms used in the detailed description are defined in the light of functions of the present invention, but the meanings of the terms may be altered according to the intention of the user or operator or according to practice. Thus, the definition of the terms should be determined on the basis of the content disclosed throughout the following detailed description.

Hereinafter, a preferred embodiment of the present invention will be described in detail with reference to the accompanying drawings.

Figure 3:
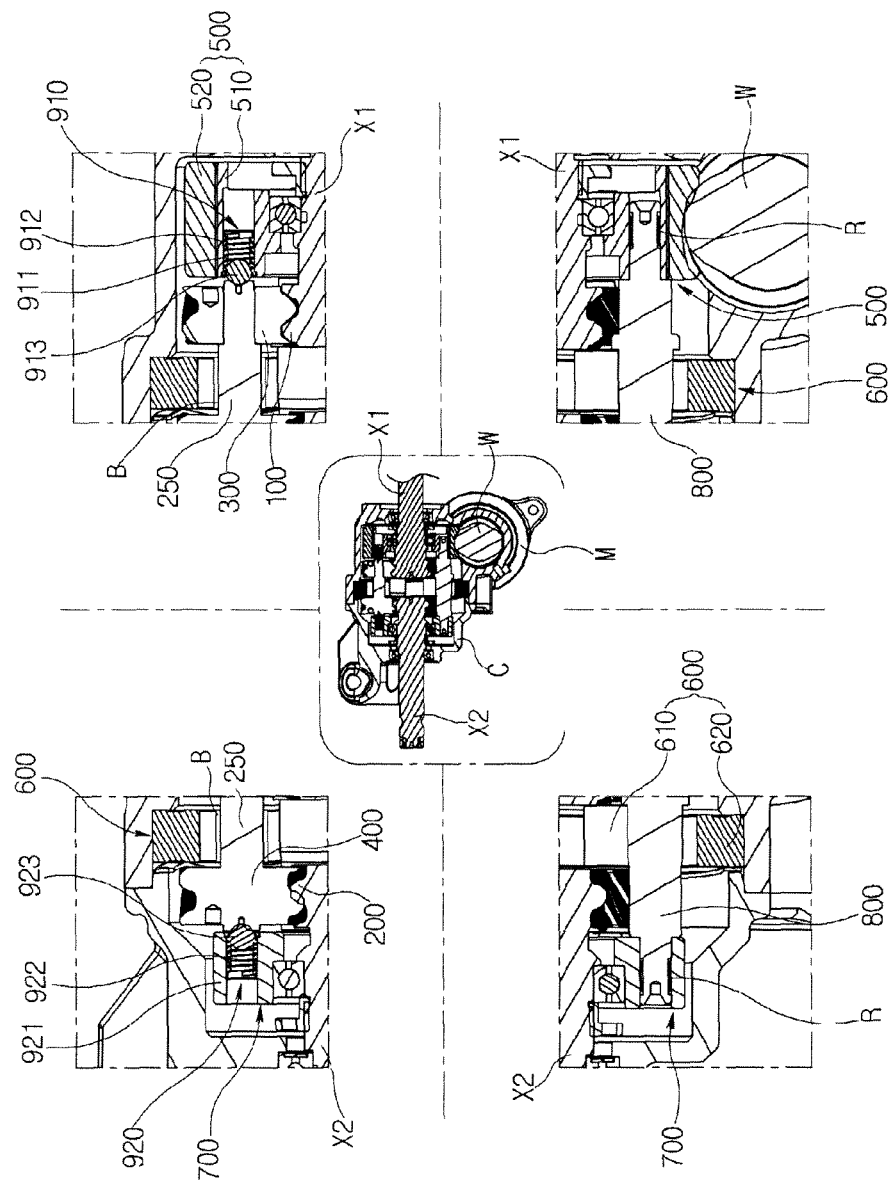
FIG. 3 is an enlarged view showing the overall structure and an essential part of an actuating device employed in a steering system for a vehicle in accordance with one embodiment of the present invention.
Figure 4:
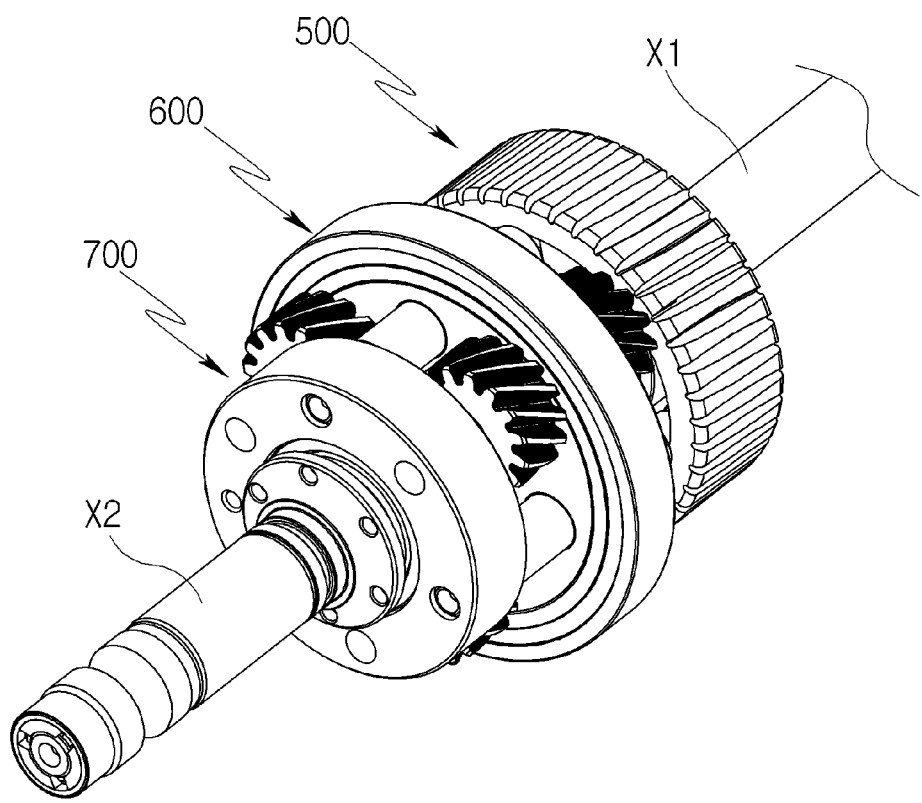
FIG. 4 is a perspective view showing an actuating device employed in a steering system for a vehicle in accordance with one embodiment of the present invention.
Figure 5:
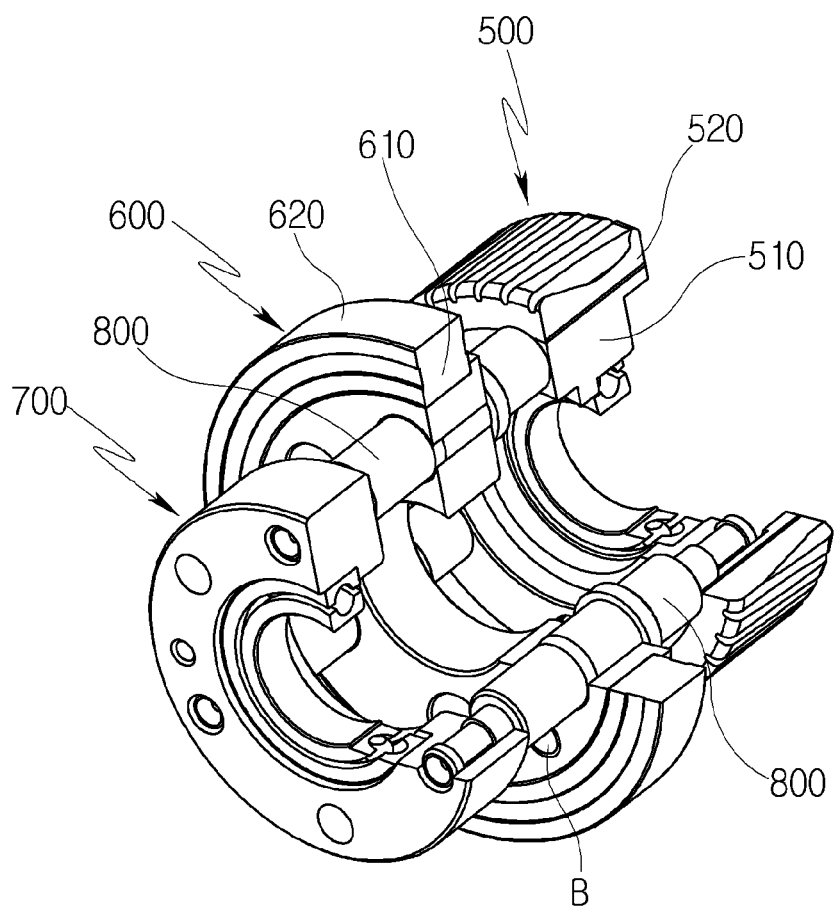
FIG. 5 is a partially cut away perspective view of an actuating device employed in a steering system for a vehicle in accordance with one embodiment of the present invention.
Figure 6:
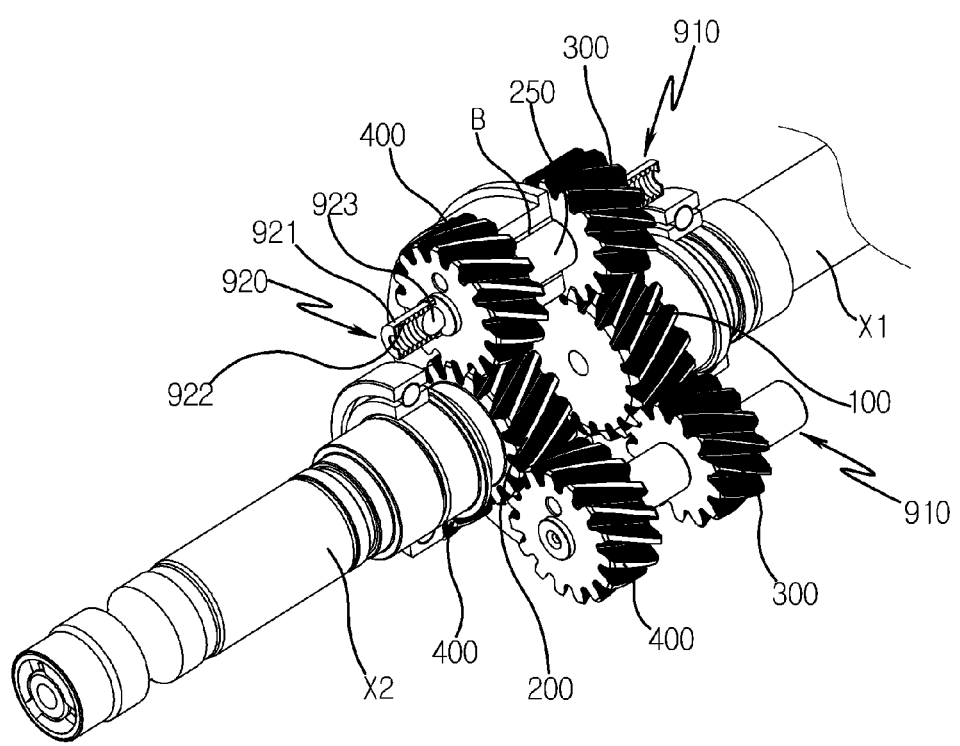
FIG. 6 is a perspective view showing the gear-coupling state between a planetary gear and a sun gear applied to an actuating device employed in a steering system for a vehicle in accordance with one embodiment of the present invention.
Figure 7:
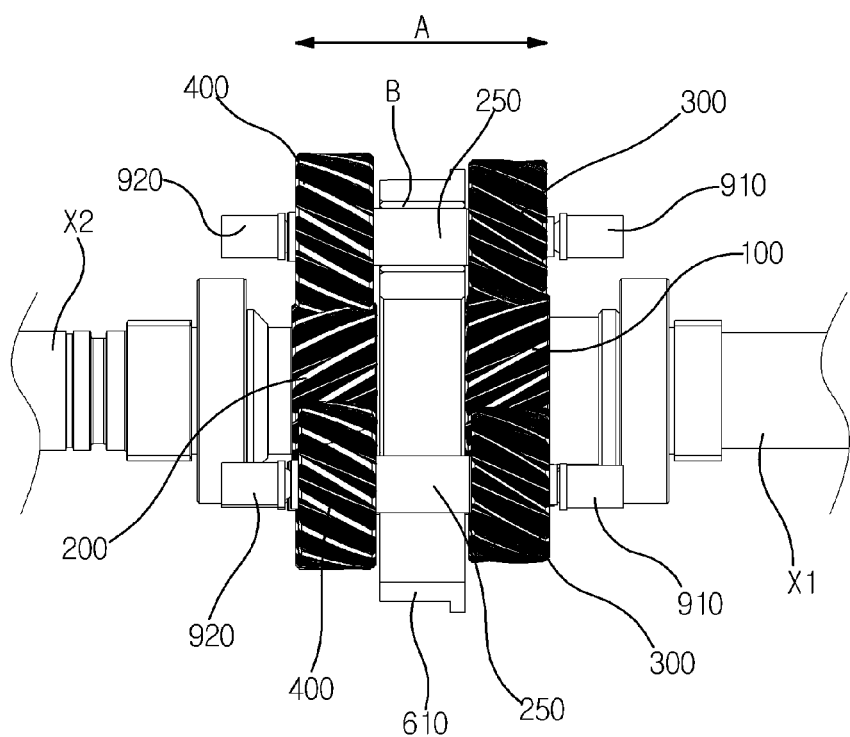
FIG. 7 is a side view showing the gear-coupling state between a planetary gear and a sun gear applied to an actuating device employed in a steering system for a vehicle in accordance with one embodiment of the present invention.

FIG. 3 is an enlarged view showing the overall structure and an essential part of an actuating device employed in a steering system for a vehicle in accordance with one embodiment of the present invention, FIG. 4 is a perspective view showing an actuating device employed in a steering system for a vehicle in accordance with one embodiment of the present invention, FIG. 5 is a partially cut away perspective view of an actuating device employed in a steering system for a vehicle in accordance with one embodiment of the present invention, FIG. 6 is a perspective view showing the gear-coupling state between a planetary gear and a sun gear applied to an actuating device employed in a steering system for a vehicle in accordance with one embodiment of the present invention, and FIG. 7 is a side view showing the gear-coupling state between a planetary gear and a sun gear applied to an actuating device employed in a steering system for a vehicle in accordance with one embodiment of the present invention.

Referring to FIG. 3 to FIG. 7, an actuating device employed in a steering system for a vehicle in accordance with one embodiment of the present invention includes an input-side sun gear 100, an output-side sun gear 200, an input-side planetary gear 300, an output-side planetary gear 400, a first plate section 500, a second plate section 600, a third plate section 700, a connecting rod 800, and damping mechanisms 910 and 920. As shown in FIG. 3, the above members are housed in a housing C.

As shown in FIG. 6, the input-side sun gear 100 is provided at an input shaft X1 of a steering shaft and is rotated integrally with the input shaft X1. Preferably, the input-side sun gear 100 is formed in a helical gear shape.

Meanwhile, the input shaft X1 of the steering shaft, on which the input-side sun gear 100 is installed, passes rotatably through the first plate section 500.

As shown in FIG. 6, the output-side sun gear 200 is provided on an output shaft X2 of the steering shaft, and is rotated integrally with the output shaft X2. Preferably, the output-side sun gear 200 is formed in a helical gear shape.

Meanwhile, the output shaft X2 of the steering shaft, on which the output-side sun gear 200 is installed, passes rotatably through the third plate section 700.

The input-side planetary gear 300 is installed on a planetary gear shaft 250 and is externally engaged with the input-side sun gear 100 and rotated. Also, the input-side planetary gear revolves around the input-side sun gear 100. Preferably, the input-side planetary gear 300 is formed in a helical gear shape.

The output-side planetary gear 400 is installed on the planetary gear shaft 250 and is externally engaged with the output-side sun gear 200 and rotated. Also, the output-side planetary gear revolves around the output-side sun gear 200. Preferably, the output-side planetary gear 400 is formed in a helical gear shape.

In addition, on the planetary gear shaft 250, the output-side planetary gear 400 is installed at a location spaced a certain distance apart from the input-side planetary gear 300.

Meanwhile, as shown in FIG. 3 and FIG. 6, the planetary gear shaft 250 on which the input-side planetary gear 300 and the output-side planetary gear 400 are installed is supported by a bearing B at only one point in a central portion thereof.

As illustrated above, in the actuating device employed in the steering system for a vehicle in accordance with the embodiment of the present invention, since the planetary gear shaft 250 on which the input-side planetary gear 300 and the output-side planetary gear 400 are installed is supported by only one bearing B, the problem of misalignment of the planetary gear shaft that occurs in the conventional device can be solved.

Hereinafter, referring to FIG. 3 and FIG. 5, the first plate section 500, the second plate section 600, the third plate section 700 and the connecting rod 800 are illustrated.

The first plate section 500 has an approximately circular disc shape and comprises a worm wheel boss 510, through which the input shaft X1 of the steering shaft rotatably passes, and a worm wheel 520 placed on the outer circumference of the worm wheel boss 510.

Here, the worm wheel boss 510 has a hollow section formed on the center portion thereof, and the input shaft X1 of the steering shaft passes through this hollow section. A bearing is provided in the hollow section of the worm wheel boss to rotatably support the input shaft X1 of the steering shaft. In addition, the worm wheel 520 is externally engaged with a worm shaft W of a motor M for steering assistance.

The second plate section 600 has an approximately circular disc shape and comprises a carrier 610 and a bearing 620 placed on the outer circumference of the carrier and installed in the housing C for rotatably supporting the carrier 610.

Here, a hollow section is formed in the center portion of the carrier 610, and bearings B, supporting the planetary gear shafts 250, are provided on portions other than the hollow section.

The third plate section 700 has an approximately circular disc shape, and has a hollow section formed in the center portion thereof, and the output shaft X2 of the steering shaft passes through this hollow section. A bearing is provided in the hollow section of the third plate section to rotatably support the output shaft X2 of the steering shaft.

The connecting rod 800 is a cylindrical shaped member for integrally connecting the first plate section 500, the second plate section 600 and the third plate section 700. The two end portions of the connecting rod 800 are inserted into the first plate section 500 and the third plate section 700, respectively, and a mid portion of the connecting rod 800 passes through the second plate section 600. At this time, it is preferable that the first plate section 500, the second plate section 600 and the third plate section 700 be connected to the connecting rod 800 by means of a tolerance ring R. If the connecting rod 800 is connected to the first plate section 500, the second plate section 600 and the third plate section 700 by means of the tolerance ring R, as noted above, this structure is advantageous in that axial vibration and radial vibration can be absorbed by the tolerance ring R.

In the meantime, it is preferable that three planetary gear shafts 250, and three input-side planetary gears 300 and three output-side planetary gears 400 mounted to the planetary gear shafts 250 be uniformly disposed around the input shaft X1 or the output shaft X2 of the steering shaft. In addition, it is preferable that three connecting rods 800 be provided, each being disposed between two of three planetary gear shafts 250, arranged as described above.

By dividing the entire structure of the actuating device employed in a steering system for a vehicle in accordance with the embodiment of the present invention into three parts, which are formed as the first plate section 500, the second plate section 600 and the third plate section 700, respectively, and by uniformly disposing three planetary gear shafts 250 and three input-side planetary gears 300 and three output-side planetary gears 400, which are provided on three planetary gear shafts 250, around the input shaft X1 or the output shaft X2 of the steering shaft, the structure can be simplified and made symmetrical so as to uniformly distribute power, the weight of the device can be reduced, and machinability and assemblability can be enhanced.

As shown in FIG. 3, FIG. 6 and FIG. 7, in the meantime, respective damping mechanisms 910 and 920 having a ball-spring damping structure may be further provided at the first plate section 500 and the third plate section 700 for elastically and axially supporting respective end portions of the planetary gear shaft 250.

Here, the damping mechanism 910 provided at the first plate section 500 comprises a damping housing 911 inserted into the first plate section 500, a spring 912 installed in the damping housing 911, and a ball 913 provided in the damping housing 911. The ball 913 can be axially moved in the damping housing 911 by the spring 912, and a portion of the ball 913 is exposed out of the damping housing 911 and is in contact with one end portion of the planetary gear shaft 250.

In addition, the damping mechanism 920 provided at the third plate section 700 comprises a damping housing 921 inserted into the third plate section 700, a spring 922 installed in the damping housing 921 and a ball 923 provided in the damping housing 921. The ball 923 can be axially moved in the damping housing 921 by the spring 922, and a portion of the ball 923 is exposed outside of the damping housing 921 and is in contact with the other end portion of the planetary gear shaft 250.

As described above, if the damping mechanisms 910 and 920 having ball-spring damping structures, which elastically and axially support the input-side planetary gear and the output-side planetary gear, are further provided at the steering system for a vehicle according to the embodiment of the present invention, since the planetary gear shaft 250 can be moved in the axial direction A, as shown in FIG. 7, during the operation of the actuating device, the tolerance of the gears can be compensated, and vibration and noise can be minimized by means of the above.

According to the actuating device employed in the steering system for a vehicle according to the embodiment of the present invention as described above, since the planetary gear shaft on which the input-side planetary gear and the output-side planetary gear are provided is supported by only one bearing, the problem of misalignment of the planetary gear shaft can be solved, and by adopting the ball-spring structure for elastically and axially the input-side planetary gear and the output-side planetary gear, tolerance of the gear can be compensated and vibration and noise can be minimized. In addition, by changing the entire structure into a shape formed by combining three parallel circular-shaped plate sections and rods connecting the plates sections, the structure can be simplified and made symmetrical so as to uniformly distribute power, the weight of the device can be reduced, and machinability and assemblability can be enhanced.

While a specific embodiment of the present invention has been described and illustrated, the present invention is not limited to the above-mentioned embodiment, and it should be understood by those skilled in the art that various changes and modifications may be made without departing from the spirit and scope of the invention as defined by the appended claims.

What is claimed is:

1. An actuating device employed in a steering system for a vehicle, comprising:
   an input-side sun gear provided on an input shaft of a steering shaft and rotated integrally with the input shaft of the steering shaft;
   an output-side sun gear provided on an output shaft of the steering shaft and rotated integrally with the output shaft of the steering shaft;
   an input-side planetary gear, which is externally engaged with the input-side sun gear, revolves around the input-side sun gear, and is provided on a planetary gear shaft; and
   an output-side planetary gear, which is externally engaged with the output-side sun gear, revolves around the output-side sun gear, and is provided on the planetary gear shaft, the output-side planetary gear being spaced a certain distance apart from the input-side planetary gear,
   wherein the planetary gear shaft, on which the input-side planetary gear and the output-side planetary gear are provided, is supported by a bearing at a portion of the planetary gear shaft positioned between respective portions at which the input-side planetary gear and the output-side planetary gear are provided in a longitudinal direction of the planetary gear shaft,
   wherein the input shaft of the steering shaft passes rotatably through a first plate section, and
   wherein a worm wheel is placed on an outer circumference of the first plate section.

2. The actuating device employed in the steering system for the vehicle according to claim 1,
   wherein the worm wheel is externally engaged with a worm shaft of a motor for steering assistance,
   wherein the output shaft of the steering shaft passes rotatably through a third plate section, which is spaced a certain distance apart from the first plate section, wherein a second plate section is provided between the first plate section and the third plate section, wherein the bearing for supporting the planetary gear shaft is provided on the second plate section, and wherein the first plate section, the second plate section and the third plate section are integrally connected to at least one connecting rod.

3. The actuating device employed in the steering system for the vehicle according to claim 2, wherein the first plate section, the second plate section and the third plate section are connected to the connecting rod by means of a tolerance ring.

4. The actuating device employed in the steering system for the vehicle according to claim 3, wherein three planetary gear shafts are uniformly disposed around the input shaft or the output shaft of the steering shaft, each of three connecting rods being disposed between two of three planetary gear shafts.

5. The actuating device employed in the steering system for the vehicle according to claim 4, wherein damping mechanisms are provided at the first plate section and the third plate section, respectively, for elastically and axially supporting both end portions of the planetary gear shaft.

6. The actuating device employed in the steering system for the vehicle according to claim 5, wherein the damping mechanism provided at the first plate section comprises a damping housing inserted into the first plate section, a spring installed in the damping housing, and a ball provided such that the ball can be axially moved in the damping housing by the spring, a portion of the ball being exposed out of the damping housing and being in contact with one end portion of the planetary gear shaft.

7. The actuating device employed in the steering system for the vehicle according to claim 5, wherein the damping mechanism provided at the third plate section comprises a damping housing inserted into the third plate section, a spring installed in the damping housing, and a ball provided such that the ball can be axially moved in the damping housing by the spring, a portion of the ball being exposed out of the damping housing and being in contact with the other end portion of the planetary gear shaft.

\* \* \* \* \*